(12) United States Patent
Wagner

(10) Patent No.: US 10,894,368 B2
(45) Date of Patent: Jan. 19, 2021

(54) METHOD AND DEVICE FOR WELDING TWO HOLLOW PROFILED RODS MADE OF PLASTIC

(71) Applicant: STÜRTZ MASCHINENBAU GMBH, Neustadt (DE)

(72) Inventor: Wladimir Wagner, Kurtscheid (DE)

(73) Assignee: STURTZ MASCHINENBAU GMBH, Neustadt (DE)

( * ) Notice: Subject to any disclaimer, the term of this patent is extended or adjusted under 35 U.S.C. 154(b) by 17 days.

(21) Appl. No.: 15/988,476

(22) Filed: May 24, 2018

(65) Prior Publication Data
US 2018/0339462 A1    Nov. 29, 2018

(30) Foreign Application Priority Data
May 29, 2017  (DE) .................. 10 2017 111 606

(51) Int. Cl.
*B29C 65/20* (2006.01)
*B29C 65/74* (2006.01)
(Continued)

(52) U.S. Cl.
CPC ............ *B29C 65/20* (2013.01); *B29C 65/022* (2013.01); *B29C 65/242* (2013.01);
(Continued)

(58) Field of Classification Search
CPC ... B29C 65/022; B29C 65/20; B29C 65/7451; B29C 65/7461; B29C 65/7841;
(Continued)

(56) References Cited

U.S. PATENT DOCUMENTS 4,752,350 A  *  6/1988  Schuster .................. B29C 37/04
156/379.6

FOREIGN PATENT DOCUMENTS

CA       2945712 A1 *  4/2017 ....... B29C 66/52431
DE    19612285 A1 * 10/1997 ............. B29C 65/02
(Continued)

*Primary Examiner* — Michael A Tolin
(74) *Attorney, Agent, or Firm* — Pauley Erickson & Swanson

(57) ABSTRACT

A method for welding two hollow profiled rods made of plastic to form a window frame. The profiled rods to be joined together are heated to a predetermined temperature by inserting a welding plate between their connecting surfaces and pressing the same against the welding plate, forming outer and inner beads, and the profiled rods are pressed together under pressure after removing the welding plate, with a simultaneous increase in the size of the weld bead. For all cross sections of the profiled rods and the plastics used for manufacturing the window frames, to obtain a type of shadow groove on the top side and/or front side and on the bottom side and/or rear side of the finished window frame in the area of or near the connecting sites of the finished window frame, only the outer beads formed on the visible surface of the subsequent window frame in the area of or near the connecting sites of the two profiled rods are pressed slightly inward after removing the welding plate forming an oblique edge, and then are removed together with the inner beads, and then the connecting surfaces of the two profiled rods are joined together.

12 Claims, 1 Drawing Sheet

(51) Int. Cl.
*B29C 65/78* (2006.01)
*E06B 3/96* (2006.01)
*B29C 65/00* (2006.01)
*B29C 65/02* (2006.01)
*B29C 65/24* (2006.01)
*B29L 31/00* (2006.01)

(52) U.S. Cl.
CPC ...... *B29C 65/7451* (2013.01); *B29C 65/7841* (2013.01); *B29C 66/02241* (2013.01); *B29C 66/1162* (2013.01); *B29C 66/324* (2013.01); *B29C 66/326* (2013.01); *B29C 66/5243* (2013.01); *B29C 66/52431* (2013.01); *B29C 66/73921* (2013.01); *B29C 66/91645* (2013.01); *B29C 66/8416* (2013.01); *B29C 66/8432* (2013.01); *B29C 66/949* (2013.01); *B29C 2793/009* (2013.01); *B29C 2793/0072* (2013.01); *B29L 2031/005* (2013.01); *E06B 3/9608* (2013.01)

(58) Field of Classification Search
CPC .......... B29C 66/0222; B29C 66/02241; B29C 66/1162; B29C 66/324; B29C 66/326; B29C 66/5223; B29C 66/5243; B29C 66/52431; B29C 66/73921; B29C 66/8432; B29C 2793/0027; B29C 2793/0054; B29C 2793/0072; B29C 2793/009; B29L 2031/005; E06B 3/9604; E06B 3/9608

See application file for complete search history.

(56) References Cited

FOREIGN PATENT DOCUMENTS

| DE | 10 2015 013 439 | A1 | | 4/2017 | |
|----|----|----|----|----|----|
| DE | 102017127483 | A1 | * | 5/2019 | ......... B29C 65/7835 |
| JP | 2011116100 | A | * | 6/2011 | ....... B29C 66/52431 |
| JP | 2013151816 | A | * | 8/2013 | ........... B29C 66/723 |
| WO | WO-2016177715 | A1 | * | 11/2016 | ............ B29C 65/20 |
| WO | WO-2017157914 | A1 | * | 9/2017 | ........... B29C 66/326 |

\* cited by examiner

METHOD AND DEVICE FOR WELDING TWO HOLLOW PROFILED RODS MADE OF PLASTIC

BACKGROUND OF THE INVENTION

Field of the Invention

This invention relates to a method for welding two hollow profiled rods made of plastic to form a window frame, in which the profiled rods to be joined together are heated to a predetermined temperature by inserting a welding plate between their connecting surfaces and pressing against the welding plate, forming a partially exterior weld bead, and then after removing the welding plate, while at the same time increasing the size of the bead, joining the surfaces together under pressure, as well as relating to a device for carrying out the method.

Discussion of Related Art

To manufacture window frames from profiled rods made of plastic having continuous chambers, welding devices with which one corner, two corners or all four corners of a window frame can be welded together, depending on the design of the manufacturing device. Each welding device has one welding head for each corner with a heatable welding plate and a chucking unit for each profiled rod. Each chucking unit has an upper and a lower bordering ramp, between which a profiled rod is held.

For the actual welding and joining operation, the two profiled rods, which are approximately 3 mm longer at each end than the dimensions of the finished window frame, are first aligned with one another and secured in a position in which the two connecting surfaces are held far enough apart from one another that the welding plate heated to the predetermined temperature can be inserted between them. Then the connecting surfaces of the two profiled rods are pressed against the welding plate and melted to the extent that the length of the profiled rods is reduced by approximately 2 mm. In this pressing operation, a first portion of a so-called weld bead is formed in all areas of the profiled rods. Next, the profiled rods are retracted briefly from the welding plate, so that the latter can return back to its starting position. Next, the heated connecting surfaces of the two profiled rods are again pressed against one another, whereupon the mentioned weld bead is enlarged, while the length of the profiled rods is further shortened by approximately 1 mm at the same time, so that the profiled rods have already reached the predetermined final dimension for the window frame at the welded and/or joined ends.

The weld beads formed by the joining of the profiled rods in the area of the connecting surfaces are not only present on the outside peripherally but also on all webs in the interior of the profiled rods. These weld beads may be sharp-edged in some cases and do not create an attractive appearance on the visible surfaces of the subsequent window frame. These weld beads are therefore removed from the visible surfaces of the welded and/or joined window frame. This is accomplished by using special blades and/or milling devices on the top and/or front sides and on the bottom and/or rear sides of the welded window frame in at least one subsequent additional operation, which usually results in the formation of a so-called shadow groove. These additional operations not only necessarily increase the amount of time required to manufacture a window frame but also require an additional device. Furthermore, a shadow groove has a somewhat rougher surface in comparison with the remaining surface of the window frame, which thus facilitates the deposition of dirt particles.

To avoid at least some of the effort for eliminating the visible weld beads, which are therefore unwanted and therefore to reduce the time required for manufacture of a window frame, a method has become known from German Patent Application 10 2015 013 439, wherein the outer portions of the weld beads formed in the area of the connecting sites of the two profiled rods on the visible surfaces of the subsequent window frame after removal of the welding plate are pressed inward, and then the welding plate is again moved to a position between the connecting surfaces of the profiled rods, and the connecting surfaces are reheated with simultaneous deformation of the weld beads pressed inward, and finally, after removing the welding plate, the connecting surfaces of the two profiled rods are joined together.

However, this known method does not yield the desired success with all the cross sections of profiled rods that are used for manufacturing window frames and with the plastics that are used. Furthermore, it is considered to be a disadvantage that a surface, which is usually completely flat, is present in the area of the connecting sites of the finished window frame on its top side and/or front side and on its bottom side and/or rear side.

SUMMARY OF THE INVENTION

This invention is based on one object of providing a method and a device that can be used for welding two profiled rods made of plastic, which are used to form a window frame and can be used with all the cross sections of profiled rods and the plastics that are used for manufacturing window frames, and a type of shadow groove is formed due to these profiled rods on its top side and/or front side and on its bottom side and/or rear side in the area of the connecting sites of the finished window frame.

To achieve this object, it is proposed according to this invention to provide a method of the generic type described above, after the welding plate has been removed, only the outer beads, which are formed on the visible surfaces of the subsequent window frame in the area of the connecting sites of the two profiled rods, are pressed slightly inward, forming an oblique edge, and then removed together with the inner beads, and next the connecting surfaces of the two profiled rods are joined together. Such slight pressing on the outer beads directed inward is understood to be pressing by approximately 0.5 to 1.5 mm, depending on the thickness of the material of the profiled rods, which are usually formed as hollow profiles.

Such a method can be used with all of the cross sections of profiled rods on the plastics used for the manufacture of window frames, and a type of shadow groove is obtained, improving the visual appearance of the window frame. Likewise, there are no longer any beads present on the visible surfaces.

BRIEF DESCRIPTION OF THE DRAWINGS

This invention is described in greater detail on the basis of an exemplary embodiment, which is shown in greatly simplified form in the drawing and is not drawn to scale.

DETAILED DESCRIPTION OF THE INVENTION

Figure 1:
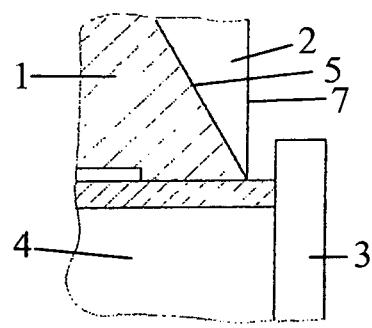
FIGS. 1-5 show details of the main parts of a device for carrying out the invention in successive method steps according to embodiments of this invention.
Figure 2:
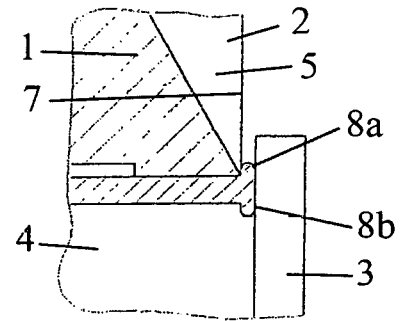

In FIGS. 1-4 of the drawings, the device according to this invention for welding profiled rods forms an essentially known window frame, only one so-called bordering ramp 1, a slide 2 and a welding plate 3 as shown with these being components of a welding head, which is essentially known and is therefore not shown here. The bordering ramp 1 shown sits on the top side of a hollow profiled rod 4 made of plastic, only portions of which can be seen, its two end faces being cut to specification and its internal continuous chambers normally being of different sizes due to appropriately arranged webs. On the bottom side of the profiled rod 4, which cannot be seen in the figure, there is a second advantageously identical bordering ramp 1, which is arranged in mirror image to the first bordering ramp 1, such that the profiled rod 4 is clamped between the two bordering ramps 1 and protrudes above the end face 5 of the bordering ramp 1, which runs obliquely and protrudes there by a predetermined amount, usually approximately 3 mm. This end face 5 runs at an acute angle of approximately 45° to 70°, advantageously less than 60°. A slide 2 having a wedge-shaped cross section and an end face 7 running at a right angle to the profiled rod 4 is guided displaceably on the end face 5, so that there is a right angle or approximately a right angle here between the end face 7 and the base surface of each bordering ramp 1.

Figure 5:
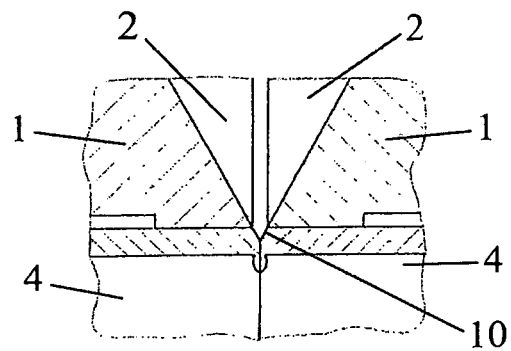

As shown in FIG. 5, the mentioned welding head has a second profiled rod 4, which is also clamped between two bordering ramps 1 in the manner described above, and with which a slide 2 is also assigned to the bordering ramp 1. This arrangement is known to be provided in mirror image on the other side of the welding plate. It may be assembled with two, four or six welding heads, depending on the design of the welding system.

To initiate the welding and/or joining operation now, the welding plate 3, which is normally outside of the area of the profiled rods 4 and is heated, is inserted between the end face and the connecting face of the two profiled rods 4, wherein each bordering ramp 1 is initially a distance of approximately 3 mm from the welding plate 3 (FIG. 1). Now the profiled rods 4 are pressed against the welding plate 3 with a predetermined force. Therefore, the end face and/or the connecting face of the two profiled rods 4 each is heated and partially melted. The size of the pressing force of the profiled rods 4 on the welding plate 3 is retained here, so the distance between each bordering ramp 1 and the welding plate 3 is reduced, and a bead 8a, 8b (FIG. 2) is formed both outside and inside the wall of each profiled rods as well as on all webs situated in the interior of the profiled rods 4, its shape possibly being different and differing from the shape shown in simplified form here. As soon as the distance between the bordering ramp 1 and the welding plate 3 has been reduced by approximately ⅔, which is approximately 2 mm, the pressing force is reduced, and the profiled rods 4 are retracted from the welding plate 3. Next the welding plate 3 is removed from the area of the profiled rods 4.

Figure 3:
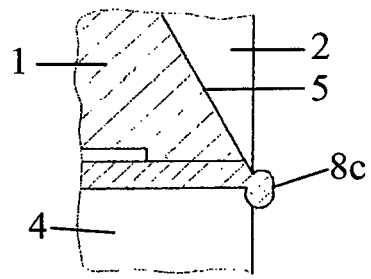

The slide 2 is operative next. By a drive (not shown) of a known design, the slide is moved out of its position according to FIGS. 1 and 2 and into the position shown in FIG. 3 by moving along the end face 6 of the bordering ramp 1. In this position, the tip of the slide 2, which is advantageously slightly rounded, is approximately at the center of the thickness of the outside wall of the profiled rod 4. With this movement of the slide 2, the resulting outer bead 8a, which is still in a plastic condition due to the heating that has preferably occurred, is necessarily pressed inward and/or downward, e.g., by approximately 1.1 mm, whereupon the two weld beads 8a and 8b are combined to form one larger bead 8c, the shape of which also does not correspond exactly to the shape drawn in the figure (FIG. 3).

Figure 4:
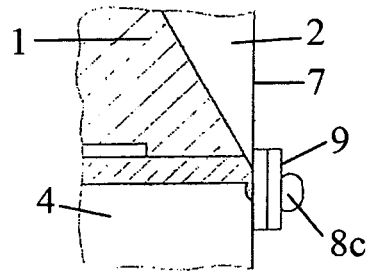

In a subsequent step, a blade 9 mounted on a carriage (not shown), for example, is used as the separating device, which is moved at a right angle to the plane of the drawing along the end face 7 of the slide 2, wherein at least most of the bead 8c of the profiled rod 4 is separated (FIG. 4). It can be advantageous if the carriage (not shown) holds another blade 9, so that most of the bead 8c is separated at the same time on both end faces of the profiled rods 4 being connected to one another. Thus, the two separating devices of a window corner are guided on a shared carriage, and the two separating devices can be held on the carriage in such a way (not shown here) that they are adjustable in height. The separated parts of the beads 8c can then be removed by a stream of air, for example, out of the area of the profiled rods 4 being connected to one another. Following that, the two slides 2 are first moved back so far away from the profiled rods that they are outside of the wall, as can be seen clearly in FIG. 5. Next, the end faces of the two profiled rods 4, which have been mitered and are still in the heated and therefore plastic state, are pressed against one another and welded (FIG. 5). This figure also shows that a small groove 10 having a V-shaped cross section remains at the surface between the two profiled rods 4 in the area of or near the connecting site. This groove 10 may also have a slightly different shape, depending on the design of the tip of the slide 2.

It is possible to move the welding plate 3 again into the area of the two profiled rods 4 after removing the separated beads 8c and to again press the profiled rods 4 against the welding plate 3. However, this pressing operation is carried out only briefly and with an extremely low pressing force, so that the length of the profiled rods 4 is shortened only insignificantly as a result, but the end faces of the profiled rods 4 are heated again. Such a brief pressing operation is understood to be a period of approximately 2 sec. to 15 sec., depending on the type and thickness of the material of the profiled rods 4.

It is known that the profiled rods 4 may be made of plastic to form a window frame, the upper and/or front surface of which is rarely completely planar. In most cases, an inclination or a rounded surface is provided on the inner and/or outer edge. To also ensure that an outer bead is no longer being formed even in these areas, for example, the slide 2 may be designed to be profiled. It is possible for at least two separate slides 2 to be provided, of which the second slide 2 runs at an angle to the first slide 2.

German Patent Reference DE 10 2017 111 606.0, filed 29 May 2017, the priority document corresponding to this invention, to which a foreign priority benefit is claimed under Title 35, United States Code, Section 119, and its entire teachings are incorporated, by reference, into this specification.

What is claimed is:

1. A method for welding two hollow profiled rods of plastic to form a window frame, the method comprising the steps of:

providing a first hollow profiled rod having a connecting surface and a second hollow profiled rod having a connecting surface, the first and second hollow profiled rods being made of plastic;

performing a first heating step of heating the connecting surface of the first hollow profiled rod and the connecting surface of the second hollow profiled rod to a predetermined temperature by: inserting a welding plate having first and second opposite sides between the connecting surfaces of the first and second hollow profiled rods; and performing a first pressing step of pressing the connecting surface of the first hollow profiled rod against the first side of the welding plate and pressing the connecting surface of the second hollow profiled rod against the second side of the welding plate; wherein the first pressing step causes the formation of an outer bead of plastic material and an inner bead of plastic material adjacent the respective connecting surface on both of the first and second hollow profiled rods; and wherein each outer bead is formed on a respective side of the first and second hollow profiled rods which corresponds to a visible surface of the window frame;

removing the welding plate from between the connecting surfaces of the first and second hollow profiled rods;

after removing the welding plate, performing a second pressing step of pressing only the outer bead on each of the first and second hollow profiled rods slightly inward, wherein the second pressing step also forms an oblique edge adjacent the respective connecting surface of both of the first and second hollow profiled rods;

after the second pressing step, removing each respective outer bead together with each respective inner bead from both of the first and second hollow profiled rods, and then joining the connecting surfaces of the first and second hollow profiled rods together.

2. The method according to claim 1, further comprising: after the step of removing the inner and outer beads, again inserting the welding plate between the connecting surfaces of the first and second hollow profiled rods and reheating the connecting surfaces.

3. The method according to claim 2, further comprising: before the first heating step: clamping the first hollow profiled rod between a first bordering ramp and a second bordering ramp, wherein the first bordering ramp is positioned on the side of the first hollow profiled rod which corresponds to the visible surface of the window frame; providing a first slide adjacent the first bordering ramp; clamping the second hollow profiled rod between a third bordering ramp and a fourth bordering ramp, wherein the third bordering ramp is positioned on the side of the second hollow profiled rod which corresponds to the visible surface of the window frame; and providing a second slide adjacent the third bordering ramp; wherein the second pressing step is performed by: moving the first slide along an end surface of the first bordering ramp such that the first slide presses the outer bead of the first hollow profiled rod slightly inward and such that the first slide forms the oblique edge adjacent the connecting surface of the first hollow profiled rod; and moving the second slide along an end surface of the third bordering ramp such that the second slide presses the outer bead of the second hollow profiled rod slightly inward and such that the second slide forms the oblique edge adjacent the connecting surface of the second hollow profiled rod.

4. The method according to claim 3, wherein: the end surface of the first bordering ramp runs at an angle of approximately 45° to 70° to a base surface of the first bordering ramp, and the end surface of the third bordering ramp runs at an angle of approximately 45° to 70° to a base surface of the third bordering ramp.

5. The method according to claim 4, wherein: the first slide has a wedge-shaped cross-section and a free end face, wherein the free end face of the first slide is approximately perpendicular to the base surface of the first bordering ramp, and the second slide has a wedge-shaped cross-section and a free end face, wherein the free end face of the second slide is approximately perpendicular to the base surface of the third bordering ramp.

6. The method according to claim 5, wherein the step of removing the respective outer bead together with the respective inner bead from both of the first and second hollow profiled rods is performed by moving a first blade parallel to the free end face of the first slide and moving a second blade parallel to the free end face of the second slide.

7. The method according to claim 6, wherein the first and second blades are mounted on a common carriage, and the steps of moving the first and second blades are performed by moving the common carriage.

8. The method according to claim 1, further comprising: before the first heating step: clamping the first hollow profiled rod between a first bordering ramp and a second bordering ramp, wherein the first bordering ramp is positioned on the side of the first hollow profiled rod which corresponds to the visible surface of the window frame; providing a first slide adjacent the first bordering ramp; clamping the second hollow profiled rod between a third bordering ramp and a fourth bordering ramp, wherein the third bordering ramp is positioned on the side of the second hollow profiled rod which corresponds to the visible surface of the window frame; and providing a second slide adjacent the third bordering ramp; wherein the second pressing step is performed by: moving the first slide along an end surface of the first bordering ramp such that the first slide presses the outer bead of the first hollow profiled rod slightly inward and such that the first slide forms the oblique edge adjacent the connecting surface of the first hollow profiled rod; and moving the second slide along an end surface of the third bordering ramp such that the second slide presses the outer bead of the second hollow profiled rod slightly inward and such that the second slide forms the oblique edge adjacent the connecting surface of the second hollow profiled rod.

9. The method according to claim 8, wherein: the end surface of the first bordering ramp runs at an angle of approximately 45° to 70° to a base surface of the first bordering ramp, and the end surface of the third bordering ramp runs at an angle of approximately 45° to 70° to a base surface of the third bordering ramp.

10. The method according to claim 9, wherein: the first slide has a wedge-shaped cross-section and a free end face, wherein the free end face of the first slide is approximately perpendicular to the base surface of the first bordering ramp, and the second slide has a wedge-shaped cross-section and a free end face, wherein the free end face of the second slide is approximately perpendicular to the base surface of the third bordering ramp.

11. The method according to claim 10, wherein the step of removing the respective outer bead together with the respective inner bead from both of the first and second hollow profiled rods is performed by moving a first blade parallel to the free end face of the first slide and moving a second blade parallel to the free end face of the second slide.

12. The method according to claim 11, wherein the first and second blades are mounted on a common carriage, and the steps of moving the first and second blades are performed by moving the common carriage.

\* \* \* \* \*